United States Patent [19]
Farlow

[11] 4,191,131
[45] Mar. 4, 1980

[54] CATTLE CHUTE WITH DIRECTIONAL RESTRICTING MEANS

[76] Inventor: Don M. Farlow, 1305 Chicago Ave., Nampa, Id. 83651

[21] Appl. No.: 888,379

[22] Filed: Mar. 20, 1978

[51] Int. Cl.² ............................................. A01K 29/00
[52] U.S. Cl. .................................................. 119/155
[58] Field of Search ................. 119/155, 82; 49/236, 49/242

[56] References Cited

U.S. PATENT DOCUMENTS

| | | | |
|---|---|---|---|
| 2,810,220 | 10/1957 | Koch | 49/236 X |
| 3,079,711 | 3/1963 | Turner | 119/155 X |
| 4,019,464 | 4/1977 | Miller | 119/155 |

*Primary Examiner*—Louis G. Mancene
*Assistant Examiner*—Robert P. Swiatek

*Attorney, Agent, or Firm*—Wells, St. John & Roberts

[57] ABSTRACT

A chute for guiding cattle along a prescribed path in single file includes a directional restricting mechanism that permits only one way travel of the cattle within the chute. The restricting mechanism includes at least one paddle that is situated in the path of the cattle but that will swing up and outwardly clear of the path upon being engaged by a forwardly moving animal. The pivotal axis of the paddle is such that the paddle will swing gravitationally back to the operative position upon leaving engagement with the animal. A stop mechanism is provided for preventing pivotal movement of the paddle in a direction opposite to the desired direction of cattle movement. Therefore, cattle moving past the paddles will be restricted at that location from moving in the opposite direction.

2 Claims, 4 Drawing Figures

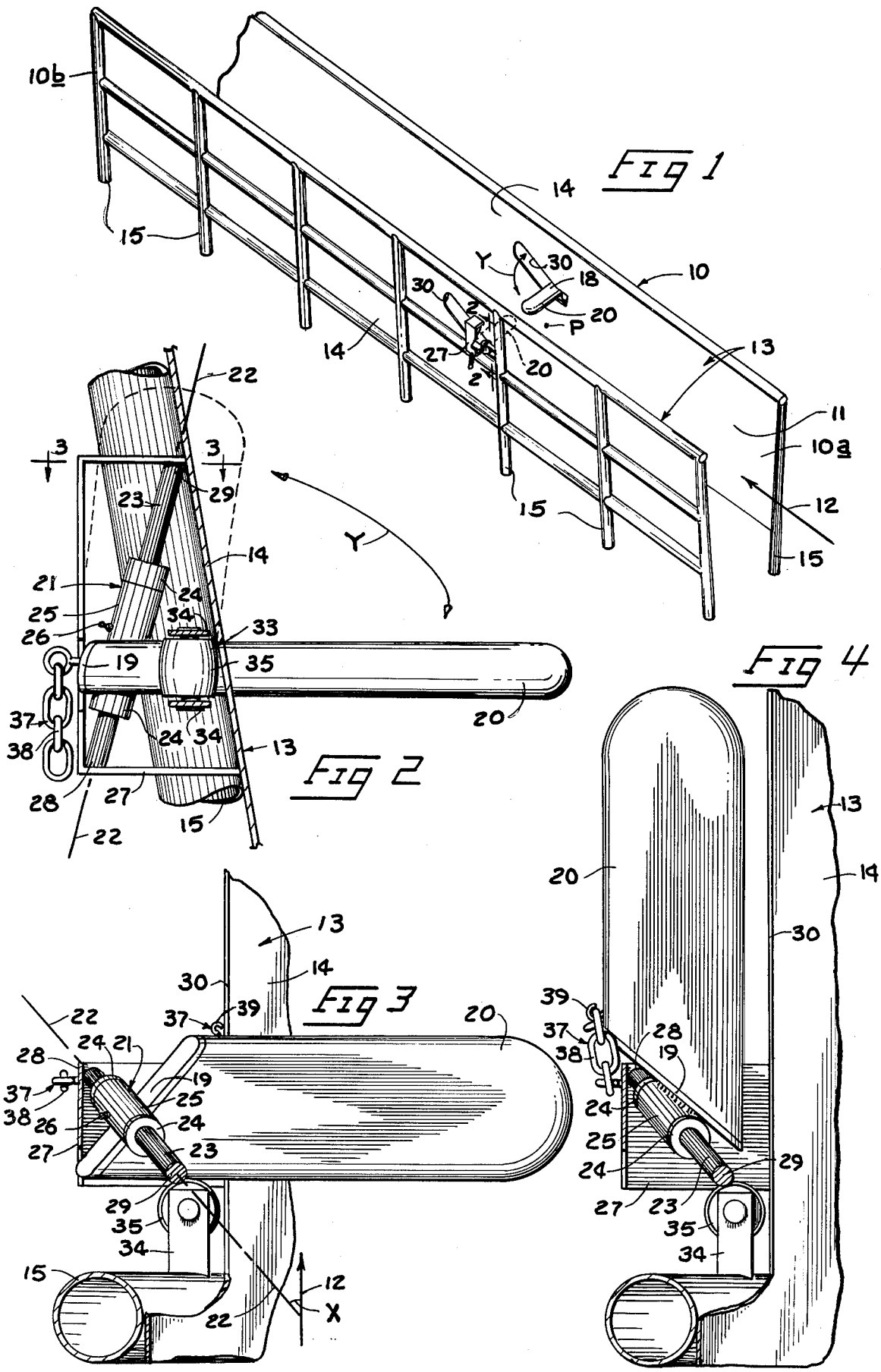

CATTLE CHUTE WITH DIRECTIONAL RESTRICTING MEANS

BACKGROUND OF THE INVENTION

The present invention is related to gangways for guiding animals in single file along a prescribed path and more particularly to such apparatus including direction restricting mechanism for allowing one-way movement of the animals along the path.

Gangways or chutes are commonly utilized in the livestock industry for directing cattle, sheep, hogs, etc. from one location to another in single file such that each animal in line may be individually treated, inspected, or loaded individually into transport vehicles.

Since large numbers of animals are often to be moved through the chute, it becomes desirable to provide some mechanism by which the animals are allowed to move only in a single forward direction. Commercially available apparatus are either manually or mechanically driven to accomplish the directional restricting function. Inadvertent or malfunctioning operation of such mechanisms can injure an animal or cause panic among the animals being driven along the path. Additionally, mechanically operable mechanisms such as are commercially available are relatively complex and expensive. Therefore, it becomes desirable to obtain a reliable safe cattle chute with integral mechanism for restricting directional movement of the animals that is simple, efficient and automatic in operation.

BRIEF DESCRIPTION OF THE DRAWINGS

A preferred embodiment of the present invention is illustrated in the accompanying drawings in which:

FIG. 1 is a pictorial view of the present chute arrangement;

FIG. 2 is a fragmentary enlarged sectional view taken substantially along line 2—2 in FIG. 1;

FIG. 3 is a plan view of the elements illustrated in FIG. 2; and

FIG. 4 is a view similar to FIG. 3 only showing different operational positions of the elements illustrated therein.

DETAILED DESCRIPTION OF A PREFERRED EMBODIMENT

A chute incorporating elements of a preferred form of the present invention is illustrated in FIG. 1 and is designated therein by the reference character 10. Chute 10 is designed to guide cattle or other livestock in single file in a desired direction as indicated by an arrow 12. Arrow 12 is also shown in FIGS. 1,3. Movement of the livestock is confined to a path 11 that is defined by a longitudinal guide means 13. Guide means 13 is situated on opposite sides of the path 11 to receive the cattle or other livestock and direct them along the path 11 in single file. Guide means 13 may include opposed rails or walls 14 that are held in place by support posts 15. The posts 15 may be anchored in the ground surface or concrete base or may simply be ground supported and portable to enable transport of the chute from one location to another.

The present chute 10 includes a gravity actuated directional restricting means that is generally indicated at 18. FIG. 1 illustrates two such mechanisms, one located on each side of the path 11. However, it is understood that a single restricting means 18 could be provided to perform the desired function of allowing livestock to move in the desired direction 12 and prevent the animals from moving rearward. It is further understood that several of the restricting means 18 may be located along the path 11 at selected intervals depending on the nature of the animals being moved through the chute and the physical length of the chute from an entrance end 10a to a discharge end 10b.

FIGS. 2 through 4 present details of the restricting means 18 and the left hand side of the chute as viewed in FIG. 1. The restricting means 18 on the opposite or right hand side of the chute in FIG. 1 is the mirror image of the left side.

Specifically each restricting means 18 includes a paddle 20 that is operatively associated with the guide means 13 by a pivot means 21. Pivot means 21 allows free gravitational pivotal movement of the paddle 20 about a fixed pivot axis 22 between an operative position as shown in FIGS. 2 and 3 wherein the paddle protrudes or projects horizontally into the path 11 and an inoperative position as shown in FIG. 4 and in dashed lines in FIG. 2 wherein the paddle 20 is substantially clear of the path 11. The elevational location of the paddle 20 and pivot means 21 is such that the paddle will project into the path of animals moving in the desired direction so as to engage such animals at their chest or brisket level. Forward motion of the animal in the desired direction 12 will cause the paddle 20 to pivot about axis 22 to the inoperative position.

The pivot axis 22 for paddle 20, as indicated in FIGS. 2 and 3 is tilted to enable free return pivotal movement of the paddle gravitationally from the inoperative position to the operative position. Specifically, the axis is tilted rearwardly or toward the preferred direction of travel and inwardly toward the path 11 defined by walls 14.

The paddle 20 is not perpendicular to the axis 22 but instead is situated angularly relative to the axis so that in the operative position (FIG. 2) it extends horizontally into the path 11. Since the paddle 20 is not perpendicular to the axis, it follows that a full swingpath formed by the paddle about the axis is not a circular plane but would be conical if carried in a full 360° rotation.

The tilted axis 22 determines the plane in which any point along the length of the paddle will move during rotation of the paddle between the operative and inoperative positions. The partial swingpath of a single point on paddle 20 is indicated at Y in FIGS. 1 and 2. The plane along which the point travels is "off-horizontal" or inclined with respect to a horizontal plane.

A low point of a full rotational swingpath is designated at P in FIG. 1. The low point P is situated downward and upstream of the paddle when in its operative position. A high point of the full swingpath (not shown) is located 180° about the axis 22 from the low point P. The high point is situated upward and outwardly from the raised inoperative position of the paddle 20. The effective actual swingpath of the paddle is located intermediate these points, forming an arc of approximately 90°. Thus, the weight of paddle 20 acting on the tilted axis 22 will always urge pivotal movement of the paddle about the axis 22 gravitationally toward the low point P in a rearward or upstream direction from the inoperative position to the operative position.

Pivot means 21 is comprised of a shaft 23 having longitudinally spaced collars 24 that confine a sleeve 25. The sleeve 25 is affixed to the paddle 20 at an inward end 19 of the paddle. Therefore, the paddle is cantilevered from the shaft 23. Sleeve 25 includes a grease fitting 26 to facilitate reception of a lubricant between the sleeve 25 and shaft 23 for extending the useful life of the restricting means 18 and to facilitate free gravitational movement of the paddle 20 between operative and inoperative positions.

The shaft 23 is mounted by a bracket 27 to the guide means 13. Bracket 27 is fixed to the shaft 23 to determine the angular relationship of the pivot axis 22 relative to the desired direction for the animals and with respect to the guide means 13. Specifically, a bottom end 28 of the shaft is located at a lower outward corner of the bracket 27 and a top end 29 is situated upstream from and inward (with respect to the path 11) of the bottom end 28. This situates the center of rotation for the paddle 20 outside of the rails or walls 14. A slit or opening 30 is provided in the rails or walls 14 to facilitate removal of the paddle 20 to its inoperative position.

A stop means 33 is included as a portion of the restricting means 18 for preventing pivotal movement of the paddle 20 in a direction opposite to the desired direction 12 beyond its operative position. Stop means 33 may include a mounting bracket 34 and roller 35 mounted thereto. In practice, the roller 35 is formed of a hardened rubber material but may be provided in other forms capable of performing the desired function of preventing movement of the paddle in the opposite "upstream" direction beyond its operative position. The bracket 34 and roller 35 are also located outside of the path 11 to present an unrestricted passageway for the animals along the path and thereby avoid injury to the animals or damage to the chute mechanisms.

It is conceived that situations may arise wherein it is desirable to eliminate the function of the restricting means 18 and allow animals confined within the chute 10 to move in the upstream direction. I provide a lockout means 37 to accomplish this function. Basically, the lockout means 37 may include a chain 38 mounted to bracket 27 and a complementary hook 39 on the paddle 20. The links of chain 38 may be connected with the hook 39 when the paddle is in the inoperative position as shown in FIG. 4 to hold the paddle 20 in its inoperative position. When the lockout means 37 is not in use, the chain 38 may hang freely as shown in FIGS. 2 and 3 clear of the path 11 and free from obstructing pivotal movement of the paddle 20.

The present chute 10 is assembled for operation with the guide rails or walls 14 situated opposite one another to define a prescribed path 11. The chute may be provided in interfitting sections to facilitate assembly and transportation for portable models, or may be adapted to be fixed permanently along a ground support surface such as a concrete slab. Animals are directed into the chute at end 10a and may travel only in single file along the path 11 because the spacing between walls 14 will accommodate only one animal across its width.

The gravity-actuated directional restricting means 18 is positioned along the walls 14 such that the paddles 20 lie within the direct path of the animals as they move in the direction 12. Preferably, each paddle 20 is situated at the chest or brisket level of the animal. The paddle 20 will swing in the direction 12 along the swingpath Y (forward and upward) to an inoperative position (such as that illustrated in dashed lines in FIG. 2) clear of the path for the animal thereby allowing forward movement of the animal along the desired direction 12. When the animal passes the paddle 20 will automatically swing downward and rearward to the operative position. The movement will be rather rapid due to the inclination of the pivot axis 22 and the lubricated low-friction fitting between the shaft 23 and sleeve 25. The paddle 20 will remain in the operative position biased against the stop means 33 until acted on by the next successive animal. The gravitational movement of the paddle 20 is halted by stop means 33 before the paddle reaches the low point of the swingpath Y. The gravitational force holding the paddle in its operative position is slight and will not cause injury to the passing animals.

Should the operator desire to move any of the livestock in the direction opposite desired direction 12, he may simply utilize the lockout means 37 to selectively lock the paddle 20 in the inoperative position as shown in FIG. 4. This is done simply by manually pivoting the paddle 20 to an inoperative position and connecting the chain 38 and hook 39. The paddle is then clear of the path 12 and the animals confined between the rails or walls 14 are free to move in the opposite direction.

The above description is given by way of example to set forth a preferred form of the invention. However, only the following claims are to be taken as strict definitions of my invention.

What I claimed is:

1. A cattle chute for guiding cattle therethrough in single file and in a desired direction along a prescribed path, comprising:
   guide means on opposite sides of the path for receiving cattle and directing the cattle along the prescribed path in single file; and
   complementary gravity-actuated directional restricting means associated with respective guide means at a prescribed location along the path for allowing the cattle to move in the desired direction past the prescribed location and for preventing the cattle from moving past the location in a direction opposite to the desired direction;
   wherein each of the gravity actuated directional restricting means comprises:
   a paddle;
   pivot means mounting the paddle to the guide means for pivotal movement about a fixed axis between an operative position wherein the paddle projects into the prescribed path and an inoperative position wherein the paddle is pivoted in the desired direction clear of the prescribed path; and
   stop means associated with the paddle for preventing pivotal movement of the paddle in a direction opposite to the desired direction beyond its operative position;
   wherein the fixed axis is tilted inward toward the path and rearward to the desired direction to define an off-horizontal swingpath for the paddle; said swingpath having a low point located at a point upstream of the operative position of the paddle with respect to the desired direction of travel to cause the paddle to automatically swing from its inoperative position to the operative position and firmly against the stop means under the influence of gravity to prevent cattle from moving in the opposite direction once the cattle have moved forward of the paddle.

2. The cattle chute as defined by claim 1 further comprising:
   lockout means selectively operable to lock the paddle in its inoperative position.

* * * * *